(12) United States Patent
Kishi et al.

(10) Patent No.: US 9,150,265 B2
(45) Date of Patent: Oct. 6, 2015

(54) GRAB-RAIL ARRANGEMENT STRUCTURE

(71) Applicant: HONDA MOTOR CO., LTD, Tokyo (JP)

(72) Inventors: Toshiaki Kishi, Wako (JP); Akira Omae, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 13/847,891

(22) Filed: Mar. 20, 2013

(65) Prior Publication Data
US 2013/0257115 A1    Oct. 3, 2013

(30) Foreign Application Priority Data
Mar. 30, 2012    (JP) .................. 2012-083198

(51) Int. Cl.
*B62J 1/28*    (2006.01)
*B62K 19/40*    (2006.01)
*B62K 19/30*    (2006.01)

(52) U.S. Cl.
CPC .. *B62J 1/28* (2013.01); *B62K 19/30* (2013.01); *B62K 19/40* (2013.01)

(58) Field of Classification Search
CPC ............ B62K 19/30; B62K 19/40; B62J 1/28
USPC .................. 180/219; 280/304.5, 288.4, 304.3
See application file for complete search history.

(56) References Cited

U.S. PATENT DOCUMENTS

| | | | | |
|---|---|---|---|---|
| 6,588,529 B2* | 7/2003 | Ishii et al. | ...................... | 180/219 |
| 6,675,933 B2* | 1/2004 | Yamaguchi | .................... | 181/227 |
| 6,709,042 B2* | 3/2004 | Takemura et al. | ........... | 296/78.1 |
| 7,651,112 B2* | 1/2010 | Ozawa | ........................ | 280/304.5 |
| 7,857,341 B2* | 12/2010 | Kobayashi et al. | ......... | 280/304.5 |
| 7,883,136 B2* | 2/2011 | Tomolillo et al. | ............ | 296/78.1 |
| 8,662,229 B2* | 3/2014 | Nakagome et al. | ........... | 180/219 |
| 2007/0089922 A1* | 4/2007 | Iwasaki | ......................... | 180/219 |
| 2007/0230198 A1* | 10/2007 | Ohzono | ........................ | 362/459 |
| 2008/0156562 A1* | 7/2008 | Yano et al. | ..................... | 180/219 |
| 2012/0181783 A1* | 7/2012 | Nakano | ......................... | 280/834 |
| 2012/0199408 A1* | 8/2012 | Hayashi et al. | ............... | 180/219 |
| 2012/0234619 A1* | 9/2012 | Nakagome et al. | ........... | 180/219 |
| 2013/0020143 A1* | 1/2013 | Kishikawa | .................... | 180/219 |

FOREIGN PATENT DOCUMENTS

| | | |
|---|---|---|
| CA | 2713503 A1 | 3/2011 |
| JP | 4097279 B2 | 6/2008 |

* cited by examiner

*Primary Examiner* — Kevin Hurley
*Assistant Examiner* — Michael Stabley
(74) *Attorney, Agent, or Firm* — Westerman, Hattori, Daniels & Adrian, LLP

(57) ABSTRACT

A rear center cover is disposed in contact with a seat edge portion and a rear end portion of a passenger seat in a tandem seat. A pair of left and right grab rails are disposed overlapping the seat edge portion in a plan view, i.e., disposed overlapping the seat edge portion and the rear center cover from above in such a way as to cover the portion connecting the rear center cover. A rear portion extends to the upper side of a recessed portion. The lower surface of the rear portion is in intimate contact with the upper side. The rear portion covers the portion connecting the rear center cover and the seat edge portion and reinforces the rear center cover.

25 Claims, 10 Drawing Sheets

GRAB-RAIL ARRANGEMENT STRUCTURE

CROSS-REFERENCE TO RELATED APPLICATIONS

The present application claims priority under 35 U.S.C. §119 to Japanese Patent Application No. 2012-083198, filed Mar. 30, 2012, the contents of which is incorporated herein, by reference, in its entirety.

TECHNICAL FIELD

This invention relates to an arrangement structure for grab rails in a saddle-ride type vehicle.

BACKGROUND OF THE INVENTION

Among motorcycles, which are saddle-ride type vehicles, there are ones in which grab rails for a passenger to grab are disposed on lateral sides of a passenger seat and attached to lateral sides of seat rails forming a vehicle body frame (see Japanese Patent No. 4097279). Moreover, covering an upper part of the vehicle body behind the seat with a rear-vehicle-body cover has been publicly known.

SUMMARY OF THE INVENTION

Conventional grab rails are separated from the seat and the rear-vehicle-body cover. Thus, these grab rails are not designed to, for example, protect the seat and the rear-vehicle-body cover from scratches and the like. For this reason, it has been desired to use grab rails to protect these parts. It has also been desired to dispose each grabbing portion closer to the seating portion of the seat to make the grabbing portion easier to grab.

A first aspect of the grab-rail arrangement structure provides a grab-rail arrangement structure for a saddle-ride type vehicle comprising: a tandem seat having a rider seat and a passenger seat disposed therebehind, the seat being attached to a vehicle body frame; a rear-vehicle-body cover covering an upper part of a vehicle body behind the seat; and a grab rail for a passenger to grab which is disposed on a lateral side near the passenger seat, wherein the grab rail has a grabbing portion and an extension portion extending on a rear side thereof, the extension portion extends rearward from the grabbing portion and is disposed to cross between an upper surface of the seat and an upper surface of the rear-vehicle-body cover in a plan view, and the extension portion extends rearward while decreasing a gap between the extension portion and the rear-vehicle-body cover.

A second aspect of the grab-rail arrangement structure is that in the first aspect, a rear end portion of the extension portion of the grab rail is attached to the rear-vehicle-body cover.

A third aspect of the grab-rail arrangement structure is that in the first or second aspect, front and rear sides of the grabbing portion are attached to the vehicle body frame, and the attachment is performed by fastening the grabbing portion together with the seat to seat attachment portions where the seat is attached to the vehicle body frame.

A fourth aspect of the grab-rail arrangement structure is that in any one of the first to third aspects, the grabbing portion is formed extending upwardly rearward while the extension portion is formed extending downwardly rearward.

A fifth aspect of the grab-rail arrangement structure is that in any one of the first to fourth aspects, the extension portion extends rearward while decreasing a gap between the extension portion and the rear-vehicle-body cover in a height direction.

A sixth aspect of the grab-rail arrangement structure is that in any one of the first to fifth aspects, the rear-vehicle-body cover is recessed in a groove shape to house the extension portion of the grab rail.

A seventh aspect of the grab-rail arrangement structure is that in any one of the first to sixth aspects, electrical equipment is disposed below the grab rail and the rear-vehicle-body cover.

An eighth aspect of the grab-rail arrangement structure provides a grab-rail arrangement structure for a vehicle comprising: a rider seat; a passenger seat disposed on a rear side of the rider seat; and a side trunk disposed on a lateral side of the passenger seat and covered together with a rear part of a vehicle body by a single rear-vehicle-body cover, wherein the grab-rail arrangement structure comprises a grab rail for a rear passenger to grab, on a lateral side near the passenger seat, the passenger seat has, on both sides of a seating surface thereof where the passenger sits, a seat edge portion which extends obliquely downward while spreading outwardly and connects to an upper surface of the rear-vehicle-body cover, and the grab rail is disposed to at least partly overlap the seat edge portion from above in a plan view.

According to the first aspect of the grab-rail arrangement structure, the extension portion of the grab rail extends from the passenger seat over the rear-vehicle-body cover while crossing between the upper surface of the seat and the upper surface of the vehicle body cover in a plan view. Moreover, the extension portion extends rearward while decreasing the gap between the extension portion and the vehicle body cover. The decreasing gap between the extension portion and the vehicle body cover makes the extension portion ungrabbable and makes only the grabbing portion grabbable. Moreover, the extension portion covers the seam between the seat and the rear-vehicle-body cover. Accordingly, the extension portion can protect this seam portion and prevent a scratch and the like from being made thereon.

According to the second aspect of the grab-rail arrangement structure, the rear end portion of the extension portion is attached to the rear-vehicle-body cover. The attachment can not only correct the positional relationship between the grab rail and the rear-vehicle-body cover but also reinforce the rear-vehicle-body cover by use of the rigidity of the extension portion.

According to the third aspect of the grab-rail arrangement structure, the front and rear sides of the grabbing portion are fastened to the vehicle body frame together with the seat by utilizing the attachment portion of the seat to the vehicle body frame. Thus, the vehicle body frame can directly receive loads inputted to the grab rail from the passenger. Accordingly, the support of the grab rail becomes stronger. Moreover, fastening the grabbing portion together with the seat can reduce the number of members for the attachment and also reduce the man-hours for the attachment.

According to the fourth aspect of the grab-rail arrangement structure, the grabbing portion and the extension portion of the grab rail differ in inclination. Accordingly, the passenger can properly recognize the grabbing portion only by touch.

According to the fifth aspect of the grab-rail arrangement structure, the extension portion extends rearward while decreasing the gap between itself and the rear-vehicle-body cover in the height direction. Thus, the extension portion is situated far from the passenger. Accordingly, the extension portion, which is a non-grabbing portion, can be made less likely to be grabbed. Moreover, since the extension portion is near the rear-vehicle-body vehicle-body cover, reinforcing the rear-vehicle-body cover with the extension portion is possible.

According to the sixth aspect of the grab-rail arrangement structure, the rear-vehicle-body cover has a grooved-shape that houses the extension portion of the grab rail. Thus, the rear-vehicle-body cover and the grab rail are near each other. Accordingly, the rear-vehicle-body cover is reinforced, increasing the rigidity of the rear-vehicle-body cover itself.

Moreover, in a side view, part of a rear end side of the extension portion of the grab rail is covered with the rear-vehicle-body cover to be invisible. Thus, the extension portion appears smaller. This provides an advantageous effect in design. Accordingly, the exterior is improved.

Furthermore, since a portion where the grab rail and the rear-vehicle-body cover are joined is hidden and invisible. Accordingly, the exterior is improved.

According to the seventh aspect of the grab-rail arrangement structure, the electrical equipment is disposed below the grab rail and the rear-vehicle-body cover. Disposing members which are rigid in the vertical direction makes deformation of the rear-vehicle-body cover less likely. Accordingly, it is possible to prevent expansion of the gap between the rear-vehicle-body cover and the seat and entry of water through the gap.

According to the eighth aspect of the grab-rail arrangement structure, in a case of a vehicle integrally including a side trunk on a lateral side of a seat, disposing a grab rail on a lateral side of the seat as in the conventional practice results in separation of the grab rail from the passenger, if the seat has, on both sides of the seating surface thereof, a seat edge portion which extends obliquely downward while spreading leftward or rightward for the purpose of smoothly connecting the seat and the upper surface of the side trunk. The separation makes it difficult for the passenger to grab the grab rail. In contrast, the grab rail is disposed in such a way as to overlap the seat edge portion from above in a plan view. Accordingly, the grabbing portion can be located near the passenger in the vehicle width direction, making the grabbing portion easily grabbable, even when the side trunk is disposed.

BRIEF DESCRIPTION OF THE DRAWINGS

The advantages of the invention will become apparent in the following description taken in conjunction with the drawings, wherein.

DETAILED DESCRIPTION OF THE INVENTION

Hereinbelow, an embodiment will be described with reference to the drawings.

Figure 1:
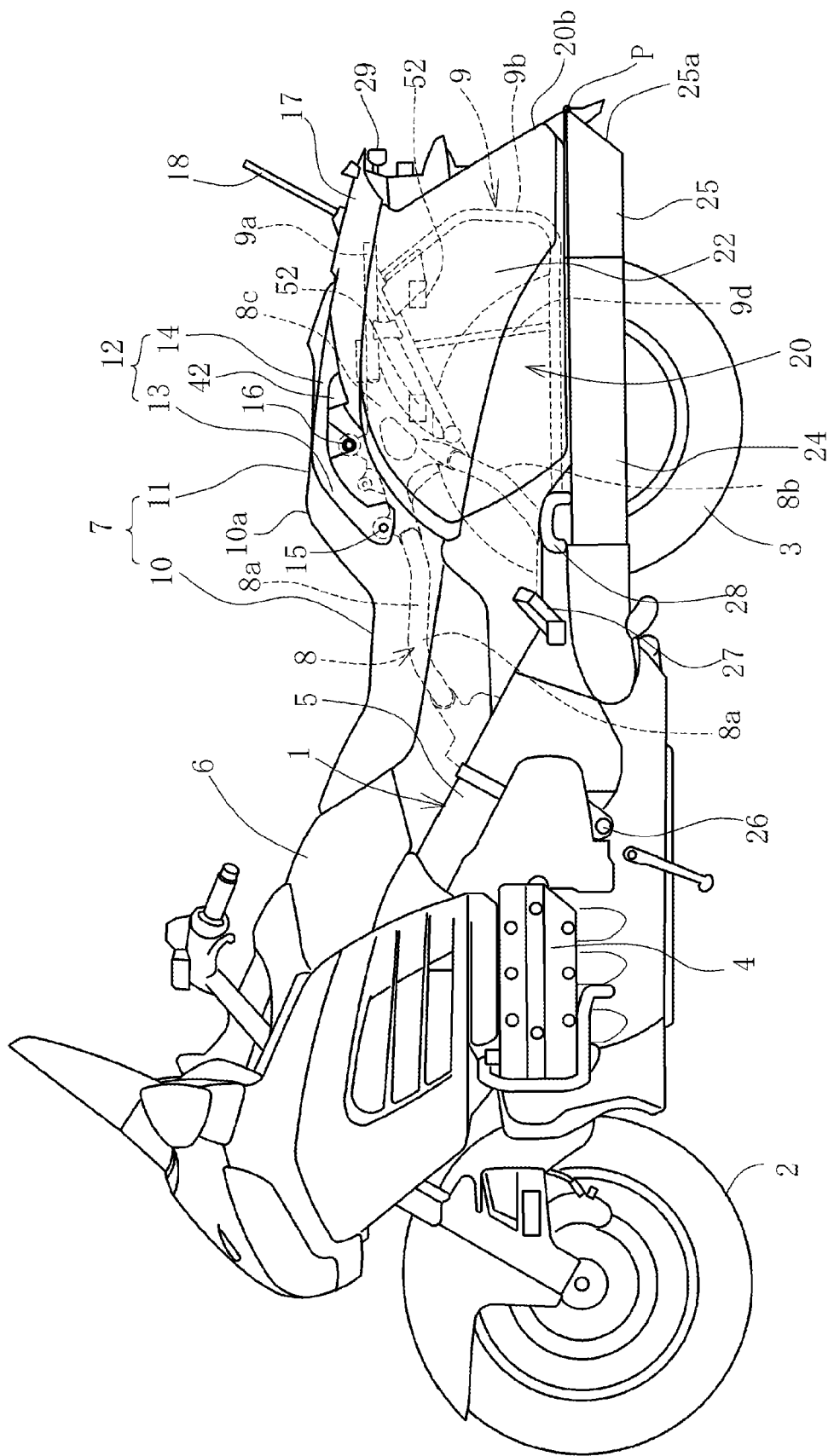
FIG. 1 is a left-side view of a vehicle according to an embodiment.
Figure 2:
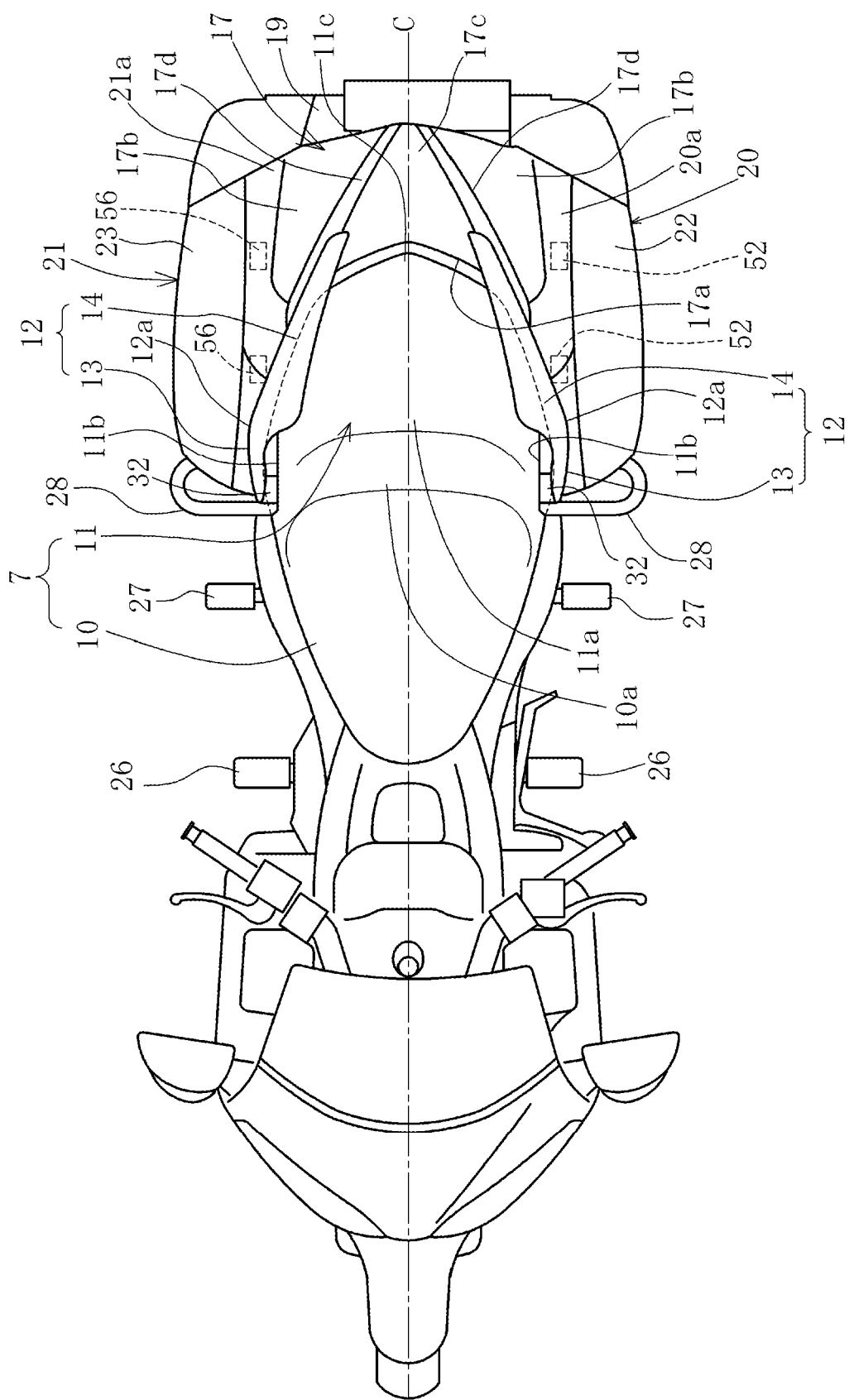
FIG. 2 is a plan view of the vehicle.

FIG. 1 is a left-side view of a large motorcycle according to this embodiment, and FIG. 2 is a plan view thereof. In these drawings, the motorcycle includes a flat engine 4 disposed on a front part of a vehicle body frame 1. A main frame 5 forming the vehicle body frame 1 supports the engine 4. A fuel tank 6 is supported on the main frame 5. Behind the fuel tank 6, a tandem seat 7 is supported on a seat rail 8. The seat rail 8 forms the vehicle body frame 1 and includes: an upper pipe 8a and a lower pipe 8b separated from each other in the front-rear direction and extending obliquely upward toward the rear from a rear portion of the main frame 5; and a joint plate 8c joining the upper pipe 8a and the lower pipe 8b at their rear end portions. The upper pipe 8a, the lower pipe 8b, and the joint plate 8c are each provided in a left and right pair.

A trunk stay 9 is provided at the rear of each seat rail 8. The trunk stay 9 includes: an upper pipe 9a extending rearward substantially horizontally from the joint plate 8c; a lower pipe 9b bending in a substantially hook shape in a side view and connecting between a rear end portion of the upper pipe 9a and a lower portion of the lower pipe 8b; a reinforcing pipe 9c diagonally coupling an upper portion of the lower pipe 8b and the rear end portion of the upper pipe 9a; and a center pipe 9d vertically connecting a middle portion of the reinforcing pipe 9c and a middle portion, in the front-rear direction, of a lower portion of the lower pipe 9b extending substantially horizontally. The upper pipe 9a, the lower pipe 9b, the reinforcing pipe 9c, and the center pipe 9d are each provided in a left and right pair.

The seat 7 is a tandem type in which a rider seat 10 and a passenger seat 11 are integrated. The passenger seat 11 is arranged at a higher position than the rider seat 10 with a backrest 10a of the rider seat 10 therebetween. There are provided grab rails 12 which extend rearward from lateral portions of the backrest 10a over the lateral sides of the passenger seat 11, respectively.

A front portion of each grab rail 12 is a grabbing portion 13 while a rear portion of the grab rail 12 is an extension portion 14 formed integrally with the grabbing portion 13 and extending rearward. The front and rear of the grabbing portion 13 are a front attachment portion 15 and a rear attachment portion 16, respectively, and are fastened to the seat rail 8 together with the seat 7.

By grabbing each grab rail 12, the passenger can stabilize his or her posture during travel. Moreover, the grab rail 12 is designed such that one can grab it when, for example, pushing or pulling the vehicle body forward or rearward while off the vehicle. Thus, one may grab the grab rail 12 to support the vehicle body while parking or after parking or may use the grab rail 12 while taking out a stand or putting it back. Moreover, during travel, the passenger can realize that his or her seating position is off a center C of the vehicle body (FIG. 2) when the left or right thigh touches the left or right grab rail. Thus, the passenger can utilize the grab rails 12 to figure out the correct seating position.

The rear of the passenger seat 11 is covered with a rear center cover 17 which corresponds to a rear-vehicle-body cover of the present application. The rear center cover 17 bulges leftward and rightward beyond a rear portion of the passenger seat 11 and a rear portion of each extension portion 14 and covers an upper part of the vehicle body behind the passenger seat 11. The extension portion 14 of each grab rail 12 is disposed on the upper surface of the rear center cover 17 in such a way as to extend from the upper surface of the passenger seat 11 in a plan view (FIG. 2).

An antenna 18 is provided to a middle portion, in the front-rear direction, of a right end portion of the rear center cover 17 and extends obliquely upward toward the rear.

A left side trunk 20 and a right side trunk 21 are provided on both left and right sides of the vehicle body below the seat 7 and supported on the trunk stays 9, respectively. The left side trunk 20 and the right side trunk 21 are provided with openable-closable lids 22 and 23, respectively.

A lower end portion of the lid 22 is attached to a body portion 20a of the left side trunk (FIG. 2; 21a is the body portion of the right side trunk) through a hinge not shown, and the lid 22 opens outward from the top toward an outer lateral side. A lid lock 52 to lock the lid 22 in a closed state is provided in a front upper portion and a rear upper portion of the left side trunk 20.

Further, there is provided a trunk opener which is a mechanism to release the lid locks 52 to open the lid 22 (details will be described later).

The right side trunk 21 side has the same structure; it is provided with the same lid locks 56 (FIG. 2) and is operated through the trunk opener.

In a lower part of the vehicle body, there is a muffler 24 extending rearward from the engine 4 substantially horizontally in a side view.

The muffler 24 extends by a lateral side of a rear wheel 3 beyond the rear of the rear wheel 3. A tail pipe 25 provided at a rear end portion extends rearward while maintaining the outer diameter of the body of the muffler 24. A rear end 25a of the tail pipe 25 has an inclining shape with a cut extending obliquely upward toward the rear in a side view. At a point P, the rear end 25a meets with a rear end surface 20b of the left side trunk 20 which extends obliquely downward toward the rear in a side view. In this way, exhaust gas does not flow over a lower portion of the left side trunk 20. The muffler 24 and the tail pipe 25 are each provided in a left and right pair, sandwiching the rear wheel 3 therebetween.

Reference numeral 26 in the drawings denotes driver steps; 27, passenger steps; 28, side bumpers; and 29, a key for an operation to unlock a key cylinder provided to the later-described trunk opener.

Next, the grab rails 12 and their periphery will be described in detail.

Figure 3:
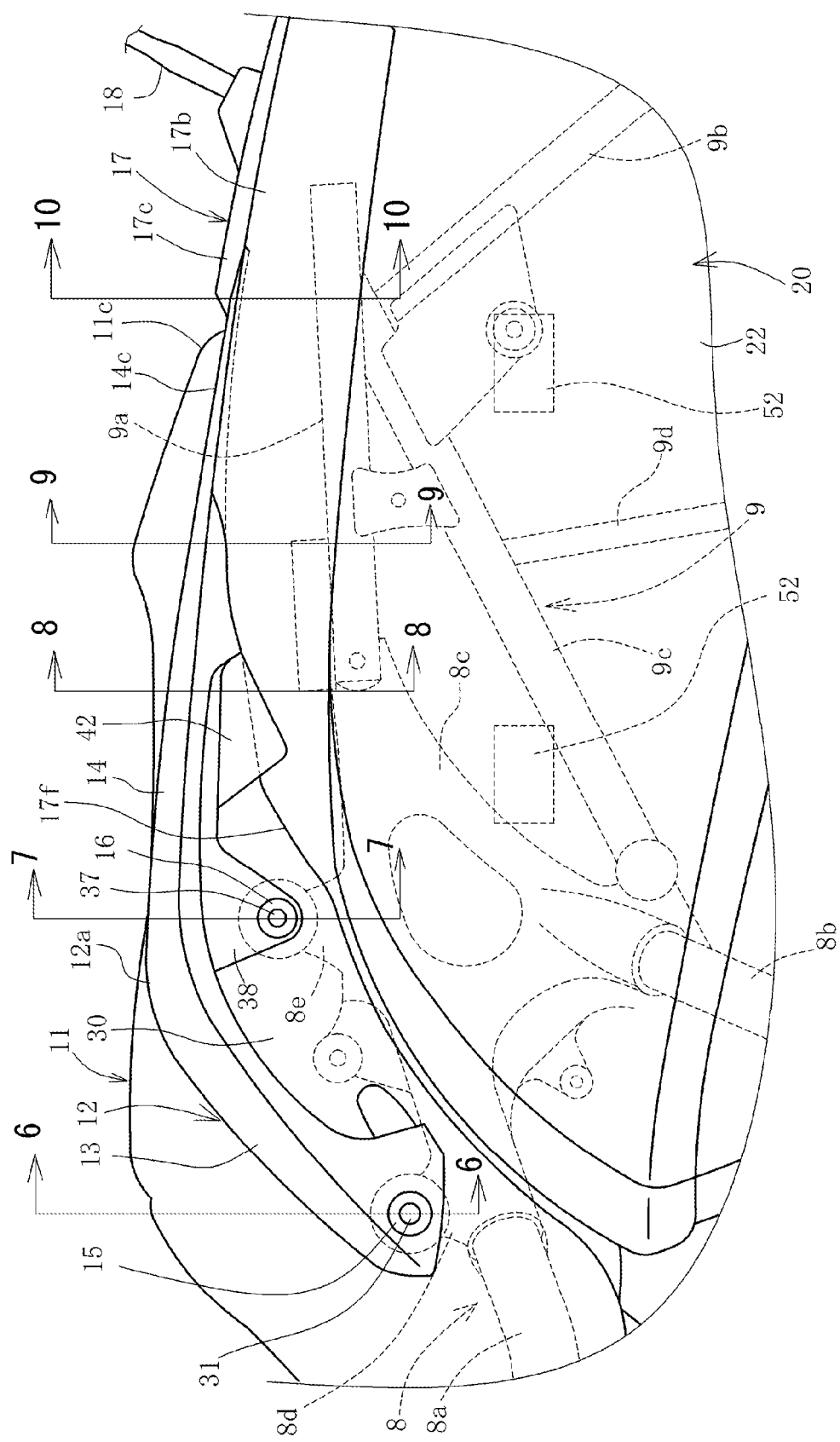
FIG. 3 is a side view of a rear part of the vehicle.
Figure 4:
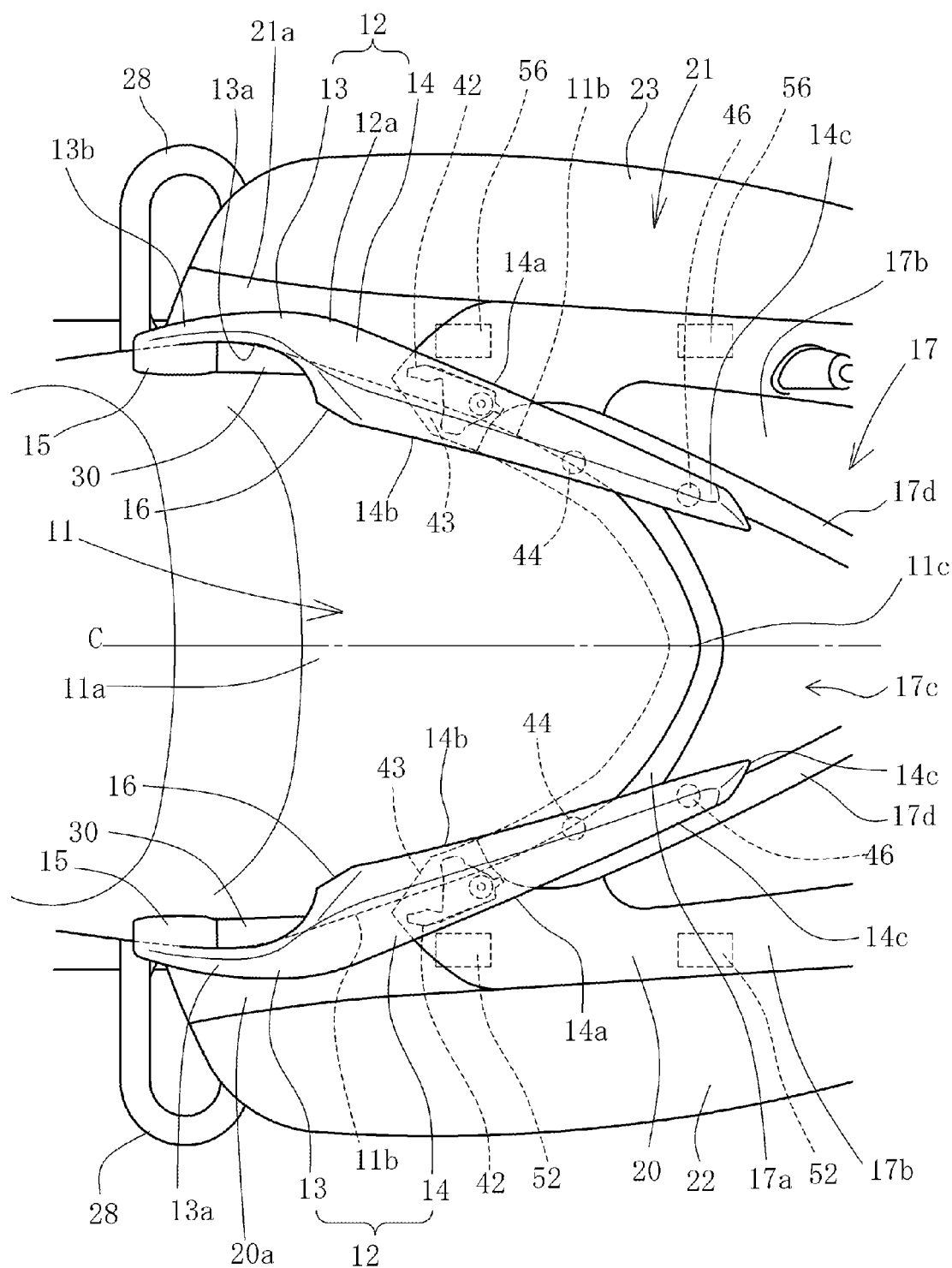
FIG. 4 is a plan view of the rear part of the vehicle.
Figure 5:
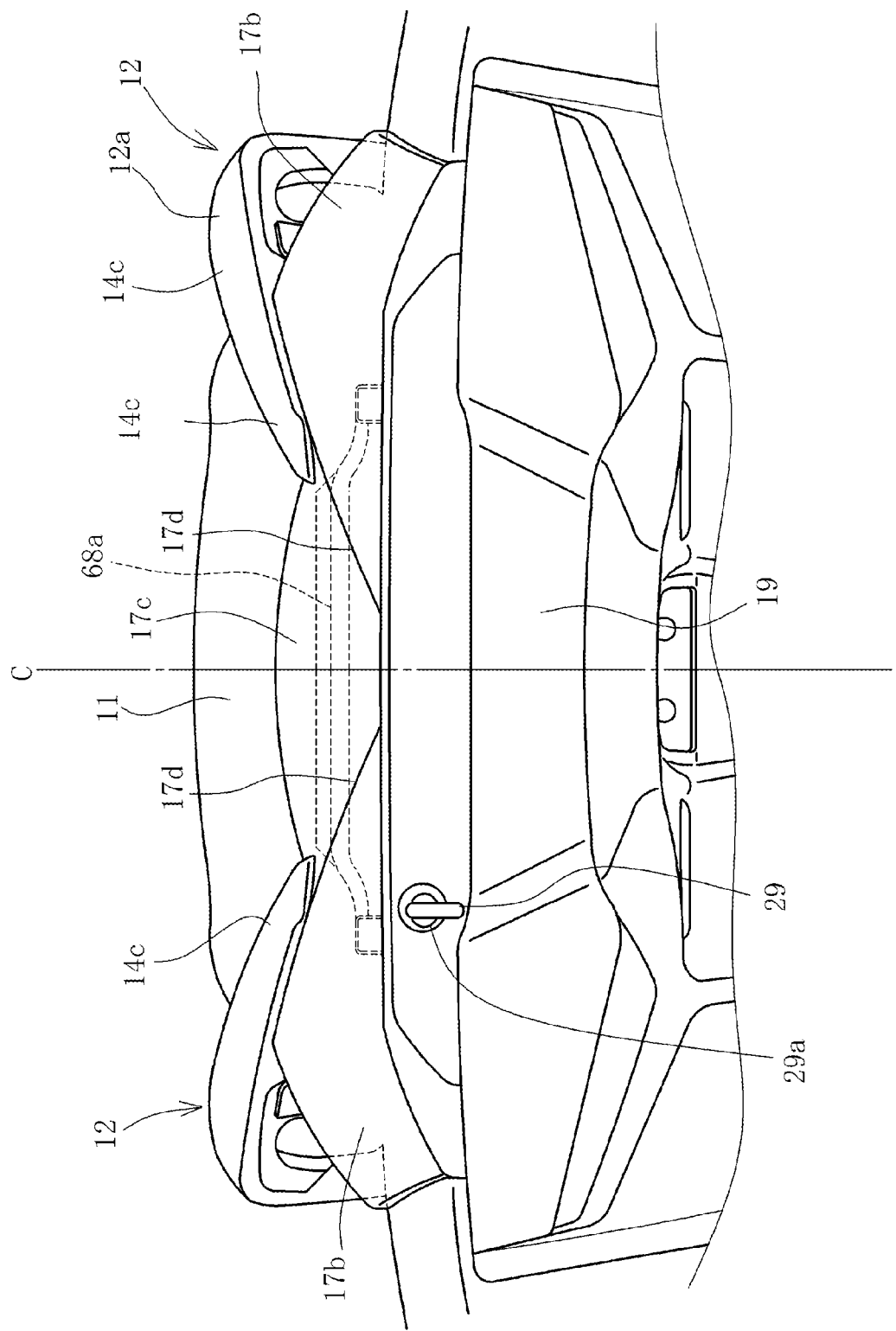
FIG. 5 is a rear view of the vehicle.

FIG. 3 is an enlarged side view of one of the grab rails 12 and its periphery. FIG. 4 is an enlarged plan view of a part including the passenger seat 11. FIG. 5 is an enlarged rear view of the grab rails 12 and their periphery in a rear part of the vehicle body.

In these drawings, the width of the passenger seat 11 is largest at its front portion 11a continuing from the backrest 10a and changes to be smaller in such a way that the passenger seat 11 becomes narrower gradually toward the rear. A rear end portion 11c has a substantially bell shape projecting rearward at the center in a plan view.

A seating portion of the passenger seat 11 for the passenger sit on has a seat edge portion 11b on its left, right, and rear sides. The seat edge portion 11b extends obliquely downward while spreading outwardly and connects to the upper surface of the rear center cover.

A front edge portion 17a of the rear center cover 17 is a recessed portion curving outward toward the rear in a plan view. The seat edge portion 11b and the rear end portion 11c of the passenger seat 11 are fitted to this recessed portion to have their peripheral portions overlap a flange portion formed on the front edge portion 17a. In this way, the peripheral portions of the seat edge portion 11b and the rear end portion 11c of the passenger seat 11 are located adjacent to the front edge portion 17a, thereby providing a link thereto.

A left front portion and a right front portion of the rear center cover 17 are respectively attached to the upper pipes 9a (FIG. 3) side with bolts 44 (FIG. 4), respectively, in the vicinity of the front edge portion 17a. Each bolt 44 is located under the extension portion 14 of the corresponding grab rail 12 and is therefore invisible from outside (see FIG. 4).

As shown in FIGS. 4 and 5, a center portion of the rear center cover 17 in the vehicle width direction is a recessed portion 17c lower than side portions 17b. The recessed portion 17c becomes narrower toward the rear. There is a stepped portion 17d at the boundary of each side portion 17b and the recessed portion 17c. Being sandwiched between the left and right stepped portions 17d, the recessed portion 17c corresponds to a groove-shaped recessed portion in the present application.

Each grab rail 12 is has a substantially dogleg shape in a side view; the grabbing portion 13 in the front extends obliquely upward toward the rear while the extension portion 14 in the rear extends downwardly rearward. The front attachment portion 15 and the rear attachment portion 16 of the grab rail 12 are attached respectively to stays 8d and 8e (see FIG. 3) provided on the joint plate 8c with a gap therebetween in the front-rear direction.

In a plan view, the grabbing portion 13 of the grab rail 12 is a small-width portion, and the width of the extension portion 14 is largest at a front portion thereof and changes to be smaller toward the rear.

The grabbing portion 13 bulges outward away from the front portion 11a, so that a grab space 30 to insert fingers is formed between a lateral portion of the front portion 11 a and the grabbing portion 13.

The extension portion 14 of the grab rail 12 extends rearward between the passenger seat 11 and the upper side of the rear center cover 17 while decreasing the vertical gap between the extension portion 14 and the rear center cover 17. The extension portion 14 then enters the recessed portion 17c.

Accordingly, in the side view of FIG. 3, a lower portion of a rear portion 14c of the extension portion 14 is covered with the side portion 17b of the rear center cover 17. As a result, the rear portion 14c of the extension portion 14 appears thinner. Moreover, an attaching portion in a rear end portion of the rear portion 14c is hidden by the rear center cover 17. Hence, the exterior can be improved.

In the plan view of FIG. 4, the extension portion 14 of each grab rail 12 has an outer lateral surface 14a bulging outward beyond the seat edge portion 11b and has a rear portion inclining in such a way as to get closer to the center C of the vehicle body. An inner lateral surface 14b of the extension portion 14 inclines similarly to the outer lateral surface 14a but is situated inward of the seat edge portion 11b. In this way, the extension portion 14 hides the portion connecting the seat edge portion 11b and the front edge portion 17a. Note that a space like the grab space 30 under the grabbing portion 13 is not formed between the extension portion 14 and the seat edge portion 11b.

The rear portion 14c of the extension portion 14 extends rearward beyond the rear end portion 11c of the passenger seat 11 and overlaps the rear center cover 17 from above. This portion overlapping the rear center cover 17 is housed in the recessed portion 17c formed on the rear center cover 17 and extends along the inner side of the stepped portion 17d.

Moreover, the rear end portion of the rear portion 14c is engaged with the recessed portion 17c of the rear center cover 17 through an engagement protrusion 46 (FIG. 4) (details will be described later).

An opener operation lever 42 (see FIG. 3) is provided near and behind each rear attachment portion 16. Operating the opener operation levers 42 actuates the trunk opener to release the lid locks, thereby allowing the lids 22 and 23 to be opened.

The opener operation levers 42 are levers to hook a finger tip to operate the trunk opener of the lid 22 and the lid 23 of the left side trunk 20 and the right side trunk 21, and each housed in a generally triangular space between the corresponding extension portion 14 and the rear center cover 17. By disposing the opener operation levers 42 under the extension portions 14, one can avoid operating the opener operation levers 42 by unintentionally putting his or her fingers on them when gripping the grab rails 12.

The operation of the trunk opener is locked by means of the cylinder lock 29a (see FIG. 5). The operation of the opener operation lever 42 is made unfunctional during the locked state, and the operation of the opener operation lever 42 is made functional during the unlocked state.

As shown in FIG. 5, the cylinder lock 29a is provided on the left side of a rear end part of the vehicle body and performs the unlocking operation with the key 29 inserted into a key hole exposed from a rear cover 19.

Figure 6:
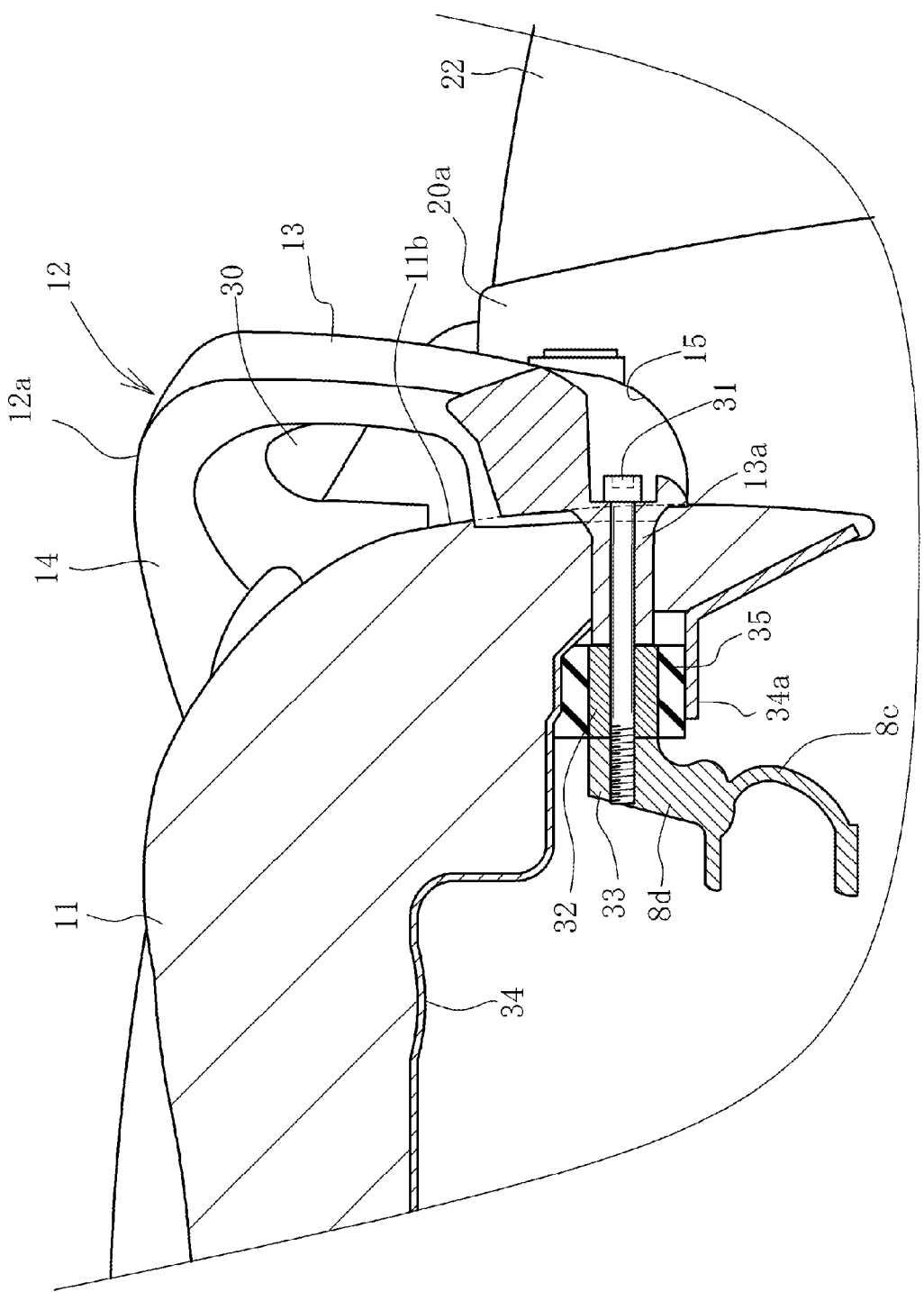
FIG. 6 is a cross-sectional view taken along line 6-6 in FIG. 3.
Figure 7:
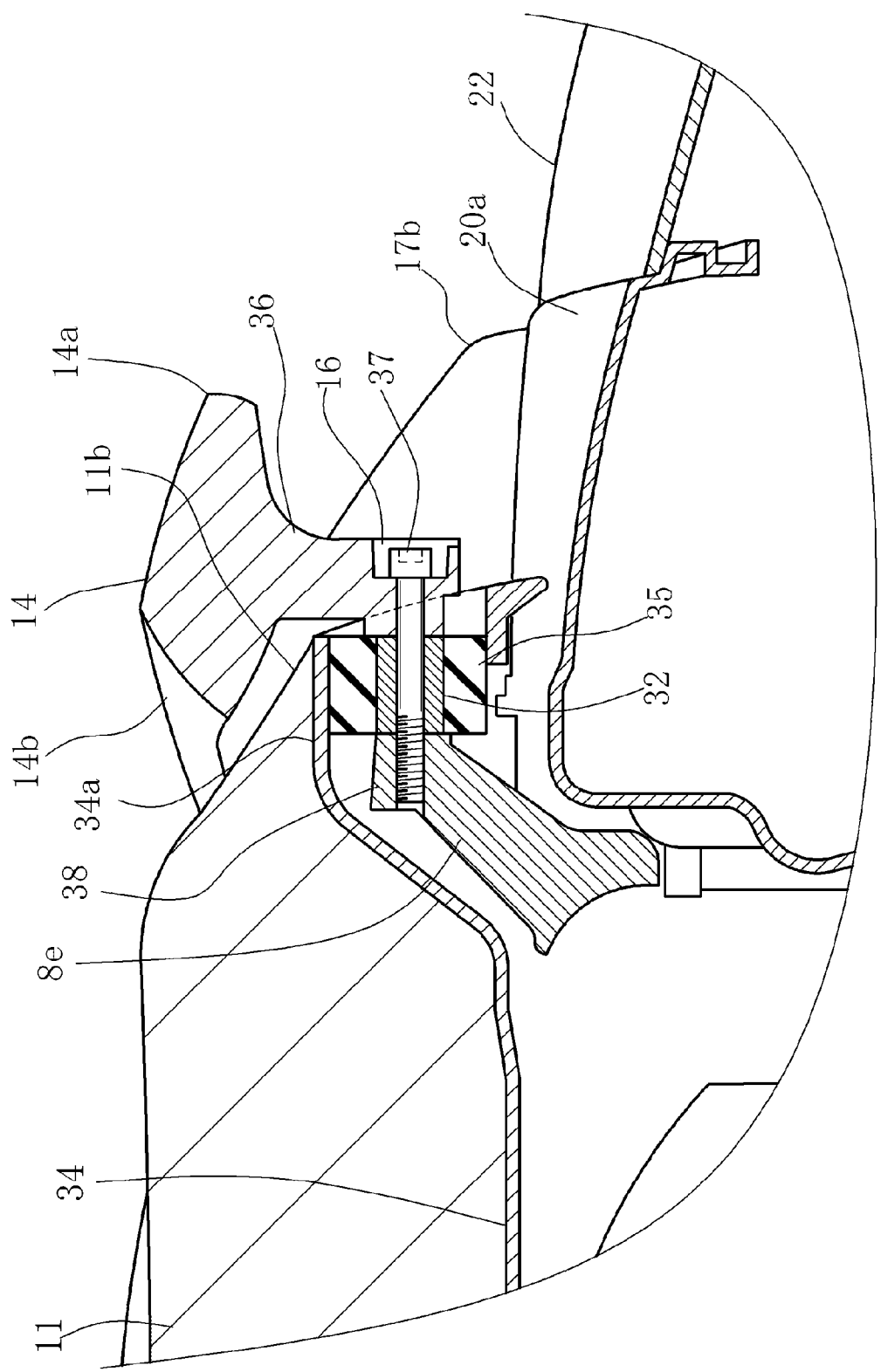
FIG. 7 is a cross-sectional view taken along line 7-7 in FIG. 3.
Figure 8:
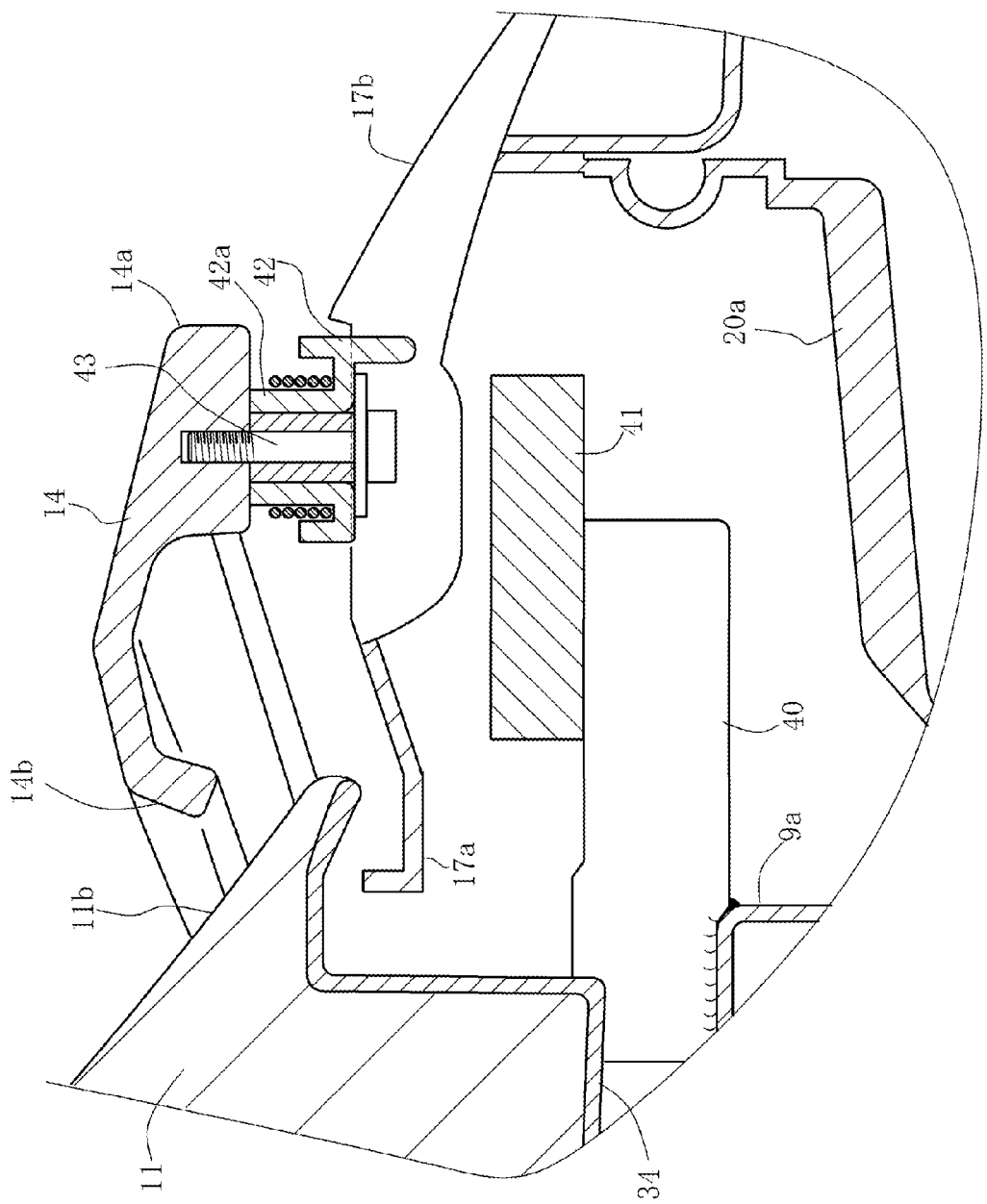
FIG. 8 is a cross-sectional view taken along line 8-8 in FIG. 3.

FIG. 6 is a cross-sectional view taken along line 6-6 in FIG. 3. Note that although FIGS. 6 to 8 show only partial cross sections of the left side, the right side is symmetrical. The front attachment portion 15 provided at a front end portion of the grabbing portion 13 forms a boss 13a projecting to the inner side of the vehicle body. At the boss 13a, the front attachment portion 15 is fastened with a bolt 31 to a nut portion 33 of the stay 8d, provided to the joint plate 8c of the seat rail 8, together with a lateral portion of the passenger seat 11.

The seat edge portion 11b of the passenger seat 11 is an inclining portion extending downwardly rearward from the seating portion. An attachment hole is formed through this inclining portion in the vehicle width direction. The boss 13a is fitted in this through-hole. A bottom plate 34 of the passenger seat 11 is provided with an attachment boss 34a at a lateral portion thereof, and a cushion rubber 35 is fitted in and supported on the attachment boss 34a. A collar 32 is fitted in an axial portion of the cushion rubber 35.

The bolt 31 is fastened into the nut portion 33 with the inner lateral surface and outer lateral surface of the collar 32 being put in contact with the nut portion 33 and the tip of the boss 13a, respectively.

In this attached state, the grabbing portion 13 is close to the seat edge portion 11b to such an extent that part thereof is situated under and vertically overlaps the grabbing portion 13. The passenger can easily grab the grabbing portion 13 by making the gap between the grabbing portion 13 and the seat edge portion 11b smaller to set the grabbing portion 13 closer to the seating portion.

FIG. 7 is a cross-sectional view taken along line 7-7 in FIG. 3. The rear attachment portion 16 is provided at a lower end portion of a stay 36 formed projecting downward from the vicinity of the boundary of the grabbing portion 13 and the extension portion 14. The rear attachment portion 16 is fastened with a bolt 37 to a nut portion 38 provided to the stay 8e of the seat rail 8, together with the passenger seat 11. The cushion rubber 35 and the collar 32 are interposed between the nut portion 38 and the stay 36.

In this attached state, the lateral portion of the passenger seat 11 overlaps the extension portion 14 from below, and there is only a small gap between the seat edge portion 11b and the lower surface of the extension portion 14. The seat edge portion 11b is connected smoothly to the upper surface of the left side trunk 20 (the same applies to the right side trunk 21).

By the attachment at the front attachment portion 15 and the rear attachment portion 16, the seat 7 is fastened to the seat rail 8 together with the grab rail 12. Here, the grab rail 12 is fastened together by utilizing the attachment portions of the seat 7 to the seat rail 8.

FIG. 8 is a cross-sectional view taken along line 8-8 in FIG. 3. A base portion 42a of the opener operation lever 42 is pivotally attached from below to the lower surface of a middle portion, in the front-rear direction, of the extension portion 14 near a front end portion of the rear center cover 17 through an attachment shaft 43. The opener operation lever 42 is engaged with an opener operation mechanism 41 attached to the upper side of an opener stay 40 fixed to the upper side of the upper pipe 9a. Pivoting the opener operation lever 42 actuates the opener operation mechanism 41 to release the lid locks 52.

Part of the rear center cover 17 is in a space under the extension portion 14 and, in the space under the extension portion 14, overlaps the passenger seat 11 from below. The body portion 20a of the left side trunk 20 is disposed outward of the opener operation mechanism 41 so as to avoid it.

Note that the opener operation mechanism 41 in the drawing is illustrated schematically. The opener operation lever 42 is provided symmetrically to the right grab rail 12, and the opener operation mechanism 41 is provided in the same manner. Thus, pivoting the right opener operation lever 42 can release the lid locks 56 (FIG. 4) in the right side trunk 21.

In the above-described portion around the opener operation lever 42, the seat edge portion 11b of the passenger seat 11 is partly situated under the extension portion 14 of the grab rail 12 with a gap between itself and the opener operation lever 42 (see FIG. 3). Moreover, the front end portion of the rear center cover 17 is located below the opener operation lever 42. Thus, there is enough space to pivot the opener operation lever 42.

Figure 9:
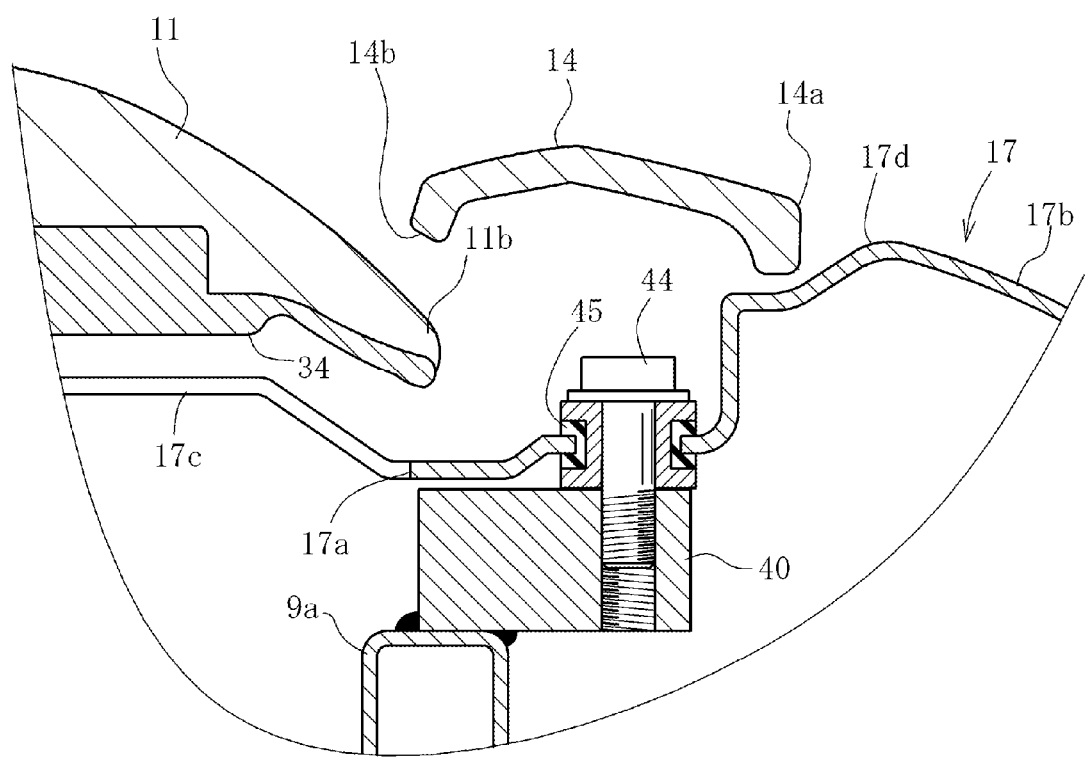
FIG. 9 is a cross-sectional view taken along line 9-9 in FIG. 3.

FIG. 9 is a cross-sectional view taken along line 9-9 in FIG. 3. Front left and front right portions of the front edge portion 17a of the rear center cover 17 are each fastened to the upper pipe 9a side with a bolt 44 through a grommet 45. This fastening portion is located under the extension portion 14 of the grab rail 12. Thus, the fastening portion is covered with and hidden by the extension portion 14 of the grab rail 12 from above and is therefore invisible from outside.

Meanwhile, there is a slight gap between the lower surface of the extension portion 14 of the grab rail 12 and the upper surface of the recessed portion 17c of the rear center cover 17, so that the extension portion 14 makes no contact with the recessed portion 17c. In this way, the recessed portion 17c of the rear center cover 17 is prevented from being damaged.

Moreover, the seat edge portion 11b of the passenger seat 11 is situated under the rear portion 14c as well, and the portion connecting the seat edge portion 11b and the front edge portion 17a is covered with the extension portion 14 as well. Part of the recessed portion 17c given inward of the grab rail 12 overlaps the passenger seat 11 from below as well.

Figure 10:
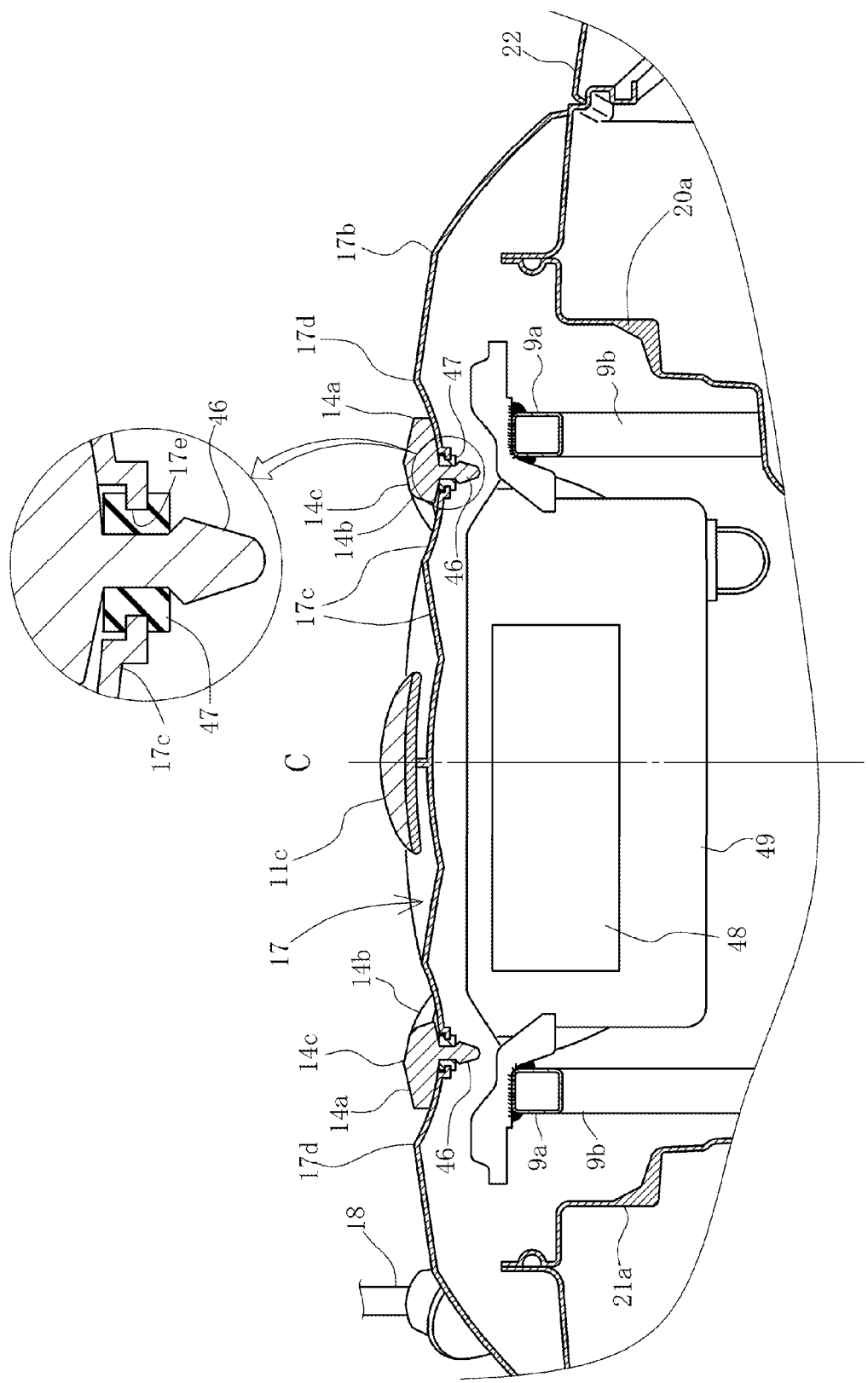
FIG. 10 is a cross-sectional view taken along line 10-10 in FIG. 3.

FIG. 10 is a cross-sectional view taken along line 10-10 in FIG. 3. The rear end portion of the rear portion 14c in the extension portion 14 of the grab rail 12 integrally includes the engagement protrusion 46 projecting downward from the bottom thereof. The engagement protrusion 46 is attached, or engaged, to the recessed portion 17c of the rear center cover 17.

As shown in the enlarged part in the drawing, a grommet 47 is attached to an engagement hole 17e provided in the recessed portion 17c. The engagement protrusion 46 is engaged with the engagement hole 17e through the grommet 47.

Accordingly, the front side of the grab rail 12 is fastened to the seat rail 8 side through the front attachment portion 15 and the rear attachment portion 16, while the rear side of the grab rail 12 is fixed in such a way as to absorb vibrations by engaging the rear end portion of the rear portion 14c with the recessed portion 17c of the rear center cover 17.

A rear portion of the rear portion 14c enters the recessed portion 17c of the rear center cover 17. The bottom of the rear portion is in contact with the surface of the recessed portion 17c while the top thereof is at substantially the same height as the stepped portion 17d.

Thus, the rear portion 14c of the extension portion 14 approaches or contacts the upper side of the rear center cover 17, and there is hardly a gap between the rear portion 14c and the rear center cover 17. Consequently, fingers cannot be put under the extension portion 14. Thus, the grabbing area in the grab rail 12 can be limited to the grabbing portion 13.

Moreover, by making the extension portion 14 ungrabbable, one can quickly find the grabbing portion 13 when trying to find the grabbing portion 13 by touch.

Furthermore, the extension portion 14 which has relatively low support stiffness as a result of being simply engaged with the rear center cover 17 can be prevented from being grabbed.

Electrical equipment 48 is disposed under the rear center cover 17. The electrical equipment 48 is, for example, an audio device housed in a storage box 49 and covered with the rear center cover 17 from above. The electrical equipment 48 is supported on a stay 68a (see FIG. 5) supported between the left and right upper pipes 9a. The storage box 49 is supported on the left and right upper pipes 9a.

When the electrical equipment 48 housed in the storage box 49 is an audio device, it can be connected to the antenna 18 located adjacent thereto via the shortest route and receive radio waves and the like through the antenna 18.

Next, operations of this embodiment will be described. As shown in FIG. 4, the extension portion 14 of each grab rail 12 extends from the passenger seat 11 over the rear center cover 17 in such a way as to cross between the upper surface of the seat 7 and the upper surface of the rear center cover 17 in a plan view. Moreover, the extension portion 14 of each grab rail 12 extends rearward while decreasing the gap between the extension portion 14 and the rear center cover 17. The decreasing gap between the extension portion 14 and the rear center cover 17 makes the extension portion 14 ungrabbable and makes only the grabbing portion 13 grabbable. Moreover, the extension portion 14 covers the seam between the seat 7 and the rear center cover 17. Accordingly, the extension portion 14 can protect this seam portion and prevent a scratch and the like from being made thereon.

Moreover, the attachment of the rear end portion of the extension portion 14 to the rear center cover 17 can not only correct the positional relationship between the grab rail 12 and the rear center cover 17 but also reinforce the rear center cover 17 by use of the rigidity of the extension portion 14. Furthermore, the attachment of the rear end portion can be done easily by the engagement thereof.

As shown in FIGS. 6 and 7, the stays 8d and 8e, which serve as attachment portions of the seat 7 to the vehicle body frame, are utilized to fasten the front and rear sides of the grabbing portion 13 to the seat rail 8 side together with the seat 7. Thus, the seat rail 8 can directly receive loads inputted to the grab rail 12 from the passenger. Accordingly, the support of the grab rail 12 becomes stronger. Moreover, fastening the grabbing portion 13 together with the seat 7 can reduce the number of members for the attachment and also reduce the man-hours for the attachment.

As shown in FIG. 3, the grabbing portion 13 and the extension portion 14 of each grab rail 12 differ in inclination in that they incline in the opposite directions. Accordingly, the passenger can properly recognize the grabbing portion 13 only by touch.

As shown in FIGS. 3 and 10, each extension portion 14 extends rearward while decreasing the gap between the extension portion 14 and the rear center cover 17 in the height direction. Thus, the extension portion 14 is situated far from the passenger. Accordingly, the extension portion 14, which is a non-grabbing portion, can be made less likely to be grabbed. Moreover, since the extension portion 14 is near the rear center cover 17, reinforcing the rear center cover 17 with the extension portion 14 is possible.

As shown in FIGS. 4 and 10, the rear center cover 17 has the grooved-shaped recessed portions 17c that house the extension portions 14 of the grab rails 12. Thus, the rear center cover 17 and the grab rails 12 are near each other. Accordingly, the rear center cover 17 is reinforced, increasing the rigidity of the rear center cover 17 itself.

Moreover, in a side view, part of a rear end side of the extension portion 14 of each grab rail 12 is covered with the rear center cover 17 to be invisible. Thus, the extension portion 14 appears smaller. This provides an advantageous effect in design. Accordingly, the exterior is improved.

Furthermore, a portion where a rear end portion of the grab rail 12 and the rear center cover 17 are joined is hidden and invisible. Accordingly, the exterior is improved.

As shown in FIG. 10, the electrical equipment 48 is disposed below the grab rails 12 and the rear center cover 17. Disposing the grab rails 12 and the electrical equipment 48 as members which are rigid in the vertical direction makes deformation of the rear center cover 17 less likely. Accordingly, it is possible to prevent expansion of the gap between the rear center cover 17 and the seat 7 and entry of water through the gap.

As shown in FIGS. 4 and 6, the grab rails 12 are disposed in such a way as to overlap the seat edge portion 11b from above in a plan view. Accordingly, the grabbing portion 13 can be located near the passenger in the vehicle width direction, making the grabbing portion 13 easily grabbable, even when the side trunks 20 and 21 are disposed with the seat 7 being connected smoothly to the upper surfaces of the side trunks 20 and 21.

In contrast, in the case of the conventional structure, grab rails designed to be disposed on the lateral sides of a seat are inevitably disposed away from the seat if the seat and the upper surfaces of side trunks on the lateral sides of the seat are to be connected smoothly through a seat edge portion. Thus, it is more difficult for the passenger to grab the grab rails.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A grab-rail arrangement structure for a saddle-ride type vehicle, comprising:
   a tandem seat including a rider seat and a passenger seat disposed therebehind, said tandem seat being attached to a vehicle body frame;
   a rear-vehicle-body cover covering an upper part of a vehicle body, behind said tandem seat; and a grab rail disposed on a lateral side of said passenger seat, said grab rail including a grabbing portion and an extension portion extending rearward from said grabbing portion, wherein said extension portion covers at least a portion of an upper surface of said tandem seat, covers at least a portion of an upper surface of said rear-vehicle-body cover, and covers a seam between said tandem seat and said rear-vehicle-body cover, in plan view, wherein as said extension portion extends rearward, a gap between said extension portion and said rear-vehicle-body cover is decreased, and wherein said rear-vehicle- body cover is recessed in a groove shape to house said extension portion of said grab rail.

2. The grab-rail arrangement structure according to claim 1, wherein a rear end portion of said extension portion is attached to said rear-vehicle-body cover.

3. The grab-rail arrangement structure according to claim 2, wherein front and rear sides of said grabbing portion are attached to said vehicle body frame by fastening said grabbing portion and said seat to seat attachment portions of said vehicle body frame.

4. The grab-rail arrangement structure according to claim 2,
wherein said grabbing portion extends upward and rearward from a front attachment portion where said grabbing portion is attached to said vehicle body frame, and
wherein said extension portion extends downward and rearward from a rear portion of said grabbing portion.

5. The grab-rail arrangement structure according to claim 2, wherein as said extension portion extends rearward, a vertical gap between said extension portion and said rear-vehicle-body cover is decreased.

6. The grab-rail arrangement structure according to claim 2, wherein electrical equipment is disposed below said grab rail and said rear-vehicle-body cover.

7. The grab-rail arrangement structure according to claim 1, wherein front and rear sides of said grabbing portion are attached to said vehicle body frame by fastening said grabbing portion and said seat to seat attachment portions of said vehicle body frame.

8. The grab-rail arrangement structure according to claim 7,
wherein said grabbing portion extends upward and rearward from a front attachment portion where said grabbing portion is attached to said vehicle body frame, and
wherein said extension portion extends downward and rearward from a rear portion of said grabbing portion.

9. The grab-rail arrangement structure according to claim 7, wherein as said extension portion extends rearward, a vertical gap between said extension portion and said rear-vehicle-body cover is decreased.

10. The grab-rail arrangement structure according to claim 7, wherein electrical equipment is disposed below said grab rail and said rear-vehicle-body cover.

11. The grab-rail arrangement structure according to claim 1,
wherein said grabbing portion extends upward and rearward from a front attachment portion where said grabbing portion is attached to said vehicle body frame, and
wherein said extension portion extends downward and rearward from a rear portion of said grabbing portion.

12. The grab-rail arrangement structure according to claim 1, wherein as said extension portion extends rearward, a vertical gap between said extension portion and said rear-vehicle-body cover is decreased.

13. The grab-rail arrangement structure according to claim 1, wherein electrical equipment is disposed below said grab rail and said rear-vehicle-body cover.

14. A grab-rail arrangement structure for a vehicle, comprising:
a rider seat;
a passenger seat disposed on a rear side of said rider seat;
a side trunk disposed on a lateral side of said passenger seat;
a single rear-vehicle-body cover, covering said side trunk and a rear part of a vehicle body; and
a grab rail on a lateral side of said passenger seat,
wherein said passenger seat includes seat edge portions which extend obliquely downward and spread outward in a vehicle width direction, said seat edge portions being connected to an upper surface of said rear-vehicle-body cover, said seat edge portions being disposed on both sides of a seating surface of said passenger seat, and
wherein said grab rail at least partly overlaps said seat edge portion from above, and covers a seam between said passenger seat and said rear-vehicle-body cover in plan view, and
wherein said rear-vehicle- body cover is recessed in a groove shape to house said extension portion of said grab rail.

15. A grab-rail arrangement structure for a saddle-ride type vehicle, comprising:
a tandem seat including a rider seat and a passenger seat disposed therebehind, said tandem seat being attached to a vehicle body frame;
a rear-vehicle-body cover covering an upper part of a vehicle body, behind said tandem seat; and
a grab rail disposed on a lateral side of said passenger seat, said grab rail including a grabbing portion and an extension portion extending rearward from said grabbing portion,
wherein said extension portion covers at least a portion of an upper surface of said tandem seat and covers at least a portion of an upper surface of said rear-vehicle-body cover, in plan view,
wherein as said extension portion extends rearward, a gap between said extension portion and said rear-vehicle-body cover is decreased, and wherein a rear end portion of said extension portion is attached to said rear-vehicle-body cover.

16. The grab-rail arrangement structure according to claim 15, wherein front and rear sides of said grabbing portion are attached to said vehicle body frame by fastening said grabbing portion and said seat to seat attachment portions of said vehicle body frame.

17. The grab-rail arrangement structure according to claim 16,
wherein said grabbing portion extends upward and rearward from a front attachment portion where said grabbing portion is attached to said vehicle body frame, and
wherein said extension portion extends downward and rearward from a rear portion of said grabbing portion.

18. The grab-rail arrangement structure according to claim 16, wherein as said extension portion extends rearward, a vertical gap between said extension portion and said rear-vehicle-body cover is decreased.

19. The grab-rail arrangement structure according to claim 16, wherein said rear-vehicle-body cover is recessed in a groove shape to house said extension portion of said grab rail.

20. The grab-rail arrangement structure according to claim 16, wherein electrical equipment is disposed below said grab rail and said rear-vehicle-body cover.

21. The grab-rail arrangement structure according to claim 15,
wherein said grabbing portion extends upward and rearward from a front attachment portion where said grabbing portion is attached to said vehicle body frame, and wherein said extension portion extends downward and rearward from a rear portion of said grabbing portion.

22. The grab-rail arrangement structure according to claim 15, wherein as said extension portion extends rearward, a vertical gap between said extension portion and said rear-vehicle-body cover is decreased.

23. The grab-rail arrangement structure according to claim 15, wherein said rear-vehicle-body cover is recessed in a groove shape to house said extension portion of said grab rail.

24. The grab-rail arrangement structure according to claim 15, wherein electrical equipment is disposed below said grab rail and said rear-vehicle-body cover.

25. A grab-rail arrangement structure for a vehicle, comprising:
a rider seat;
a passenger seat disposed on a rear side of said rider seat;
a side trunk disposed on a lateral side of said passenger seat;
a single rear-vehicle-body cover, covering said side trunk and a rear part of a vehicle body; and
a grab rail on a lateral side of said passenger seat,
wherein said passenger seat includes seat edge portions which extend obliquely downward and spread outward in a vehicle width direction, said seat edge portions being connected to an upper surface of said rear-vehicle-body cover, said seat edge portions being disposed on both sides of a seating surface of said passenger seat,
wherein said grab rail at least partly overlaps said seat edge portion from above, in plan view, and
wherein a rear end portion of said grab rail is attached to said rear-vehicle-body cover.

* * * * *